March 7, 1933.  J. A. KRANTZ  1,900,750
STOVEPIPE
Filed Nov. 24, 1931  2 Sheets-Sheet 1

J. A. Krantz
INVENTOR

BY Frease and Bishop ATTORNEYS

March 7, 1933. J. A. KRANTZ 1,900,750
STOVEPIPE
Filed Nov. 24, 1931 2 Sheets-Sheet 2

J. A. Krantz
INVENTOR

BY Frease and Bishop ATTORNEYS

Patented Mar. 7, 1933

1,900,750

UNITED STATES PATENT OFFICE

JOSEPH A. KRANTZ, OF DOVER, OHIO, ASSIGNOR TO THE REEVES MANUFACTURING COMPANY, OF DOVER, OHIO, A CORPORATION OF OHIO

STOVEPIPE

Application filed November 24, 1931. Serial No. 577,040.

The invention relates to sheet metal pipe, particularly to the class of pipe commonly called stovepipe, and more especially to a lock joint for such pipes.

The form of pipe to which the invention relates is of the type generally designated as lock joint pipe, being provided with interlocking formations along the edges of the pipe sections whereby they may be shipped in nested condition, the edges of the pipe sections being brought together and locked by engagement of the interlocking formations, by the dealer or user to whom they are shipped.

An object of the present improvement is to provide a lock joint for metal pipes including a raw edge upon one interlocking formation arranged to interlock with an angular locking shoulder upon the other interlocking formation of the pipe section.

Another object of the improvement is to provide a lock joint for metal pipes including an angular locking shoulder at each edge of the pipe section for interlocking engagement with the formation upon the other edge whereby a double interlocking joint is provided.

A still further object of the improvement is to provide a lock joint for metal pipes in which the formation at each edge of the pipe section includes an angular locking shoulder and a raw edge for interlocking engagement with the angular locking shoulder upon the other edge thereof.

A still further object of the improvement is to provide a raw edge upon one formation for interlocking engagement in the crotch or angle of a locking shoulder of the other formation.

Figure 1:
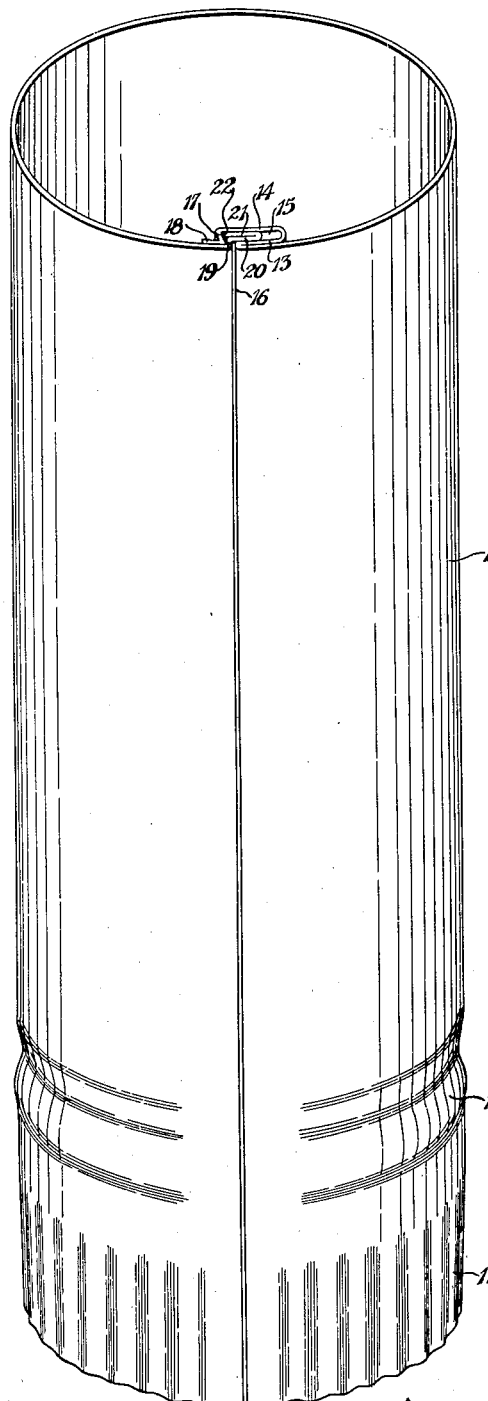
Figure 2:
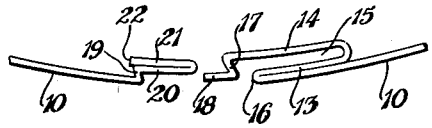
Figure 3:
Figure 4:
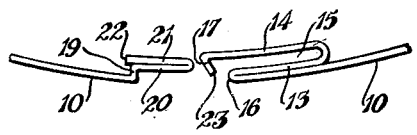
Figure 5:
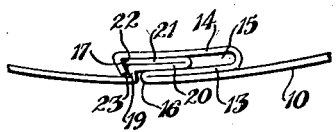
Figure 6:
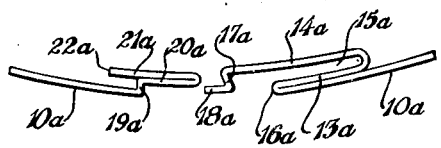
Figure 7:
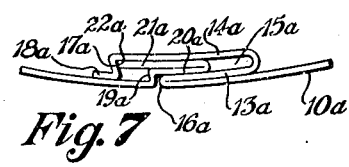
Figure 8:
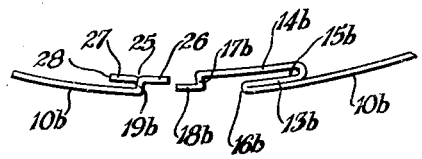
Figure 9:
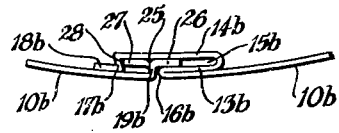
Figure 10:
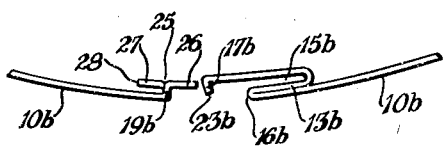
Figure 11:
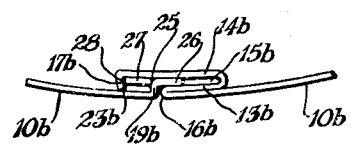

The above and other objects which will be apparent may be attained by constructing the improved lock joint in the manner illustrated in the accompanying drawings, in which Figure 1 is a perspective view of a section of stovepipe provided with the improved lock joint;

Fig. 2, a fragmentary end view of the edge portions of a pipe section provided with the locking formations shown in Fig. 1, showing the same in the unlocked position;

Fig. 3, an end view of the same parts in locked position;

Fig. 4, a view similar to Fig. 2 of a modified form of the invention;

Fig. 5, an end view of the parts shown in Fig. 4 in the locked position;

Fig. 6, a view similar to Figs. 2 and 4 of another form of the invention;

Fig. 7, an end view of the parts shown in Fig. 6 in locked position;

Fig. 8, a view similar to Figs. 2, 4 and 6 showing a further form of the invention;

Fig. 9, an end view of the parts shown in Fig. 8, showing the same in locked position;

Fig. 10, a view similar to Figs. 2, 4, 6 and 8 of a still further form of the invention;

Fig. 11, an end view of the parts shown in Fig. 10 in locked position; and

Figure 12:
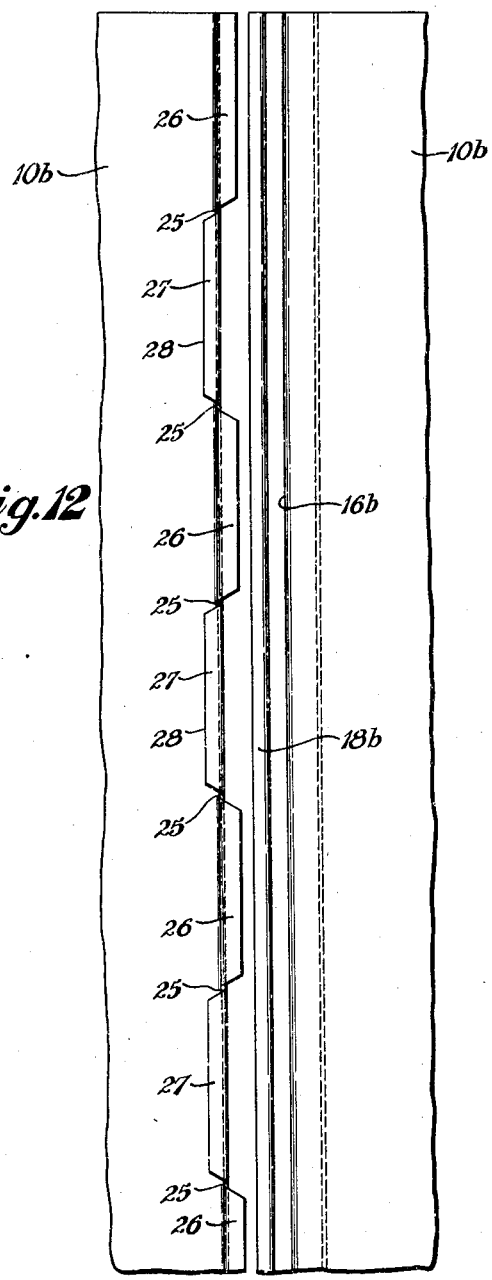

Fig. 12, an interior elevation of the edge portions of a pipe section showing interlocking formations thereon as shown in Fig. 8.

Similar numerals refer to similar parts throughout the drawings.

A section of stovepipe is shown generally at 10 in Fig. 1 and one end thereof may be crimped as indicated at 11 and provided with a bead 12 as in usual practice, neither the crimping nor the bead extending to the edges of the pipe section so as not to interfere with the interlocking formations to which the invention pertains, and which are provided at the edges of the pipe section.

In Figs. 2 and 3 is shown, on a larger scale, and in open and locked positions respectively, the form of lock joint shown in Fig. 1. In forming this lock joint the locking formation at one longitudinal edge of the pipe section is produced by folding the metal inward from the periphery of the pipe and back upon itself as shown at 13 upon the interior of the pipe section, the metal being then folded in the reverse direction as shown at 14 and spaced from and preferably parallel with the portion 13, forming the groove or pocket 15 therebetween.

In order that the exterior of the joint may be flush and the exterior of the pipe section smooth and unbroken, the portion 14 may extend slightly beyond the folded edge 16, at which point it is provided with the angular locking shoulder 17 which is preferably inclined rearwardly and may be strengthened by the forwardly extending guide flange 18 located substantially in line with the folded portion 13.

The opposite edge of the pipe section is provided with an interlocking formation adapted to be interlocked with the formation above described which may be provided by bending the metal inwardly, forming the angular locking shoulder 19, which is preferably inclined rearwardly the metal being then bent forward as at 20 and then inwardly and rearwardly upon itself as at 21, forming a folded tongue which terminates in a raw edge 22 perferably extended rearwardly of the locking shoulder 19.

In closing the joint to lock the edges of the pipe section together, the folded tongue 20—21 is guided upon the flange 18 and inserted between the folded edge 16 and the locking shoulder 17 and into the groove or pocket 15 of the opposite formation and the edges of the pipe section are pressed together until the tongue formation snaps into place within the pocket formation as shown in Figs. 1 and 3, the raw edge 22 being locked within the crotch or angle of the locking shoulder 17, the outer end of which is also locked within the crotch or angle of the locking shoulder 19, thus providing a double interlocking joint.

In the form of the invention shown in Figs. 4 and 5, the reinforcing and guiding flange 18 is eliminated from the locking shoulder 17, said locking shoulder terminating in a raw edge 23. The parts are otherwise the same as shown in Figs. 1 to 3 inclusive and the same reference numerals are applied thereto.

In this form of the invention it will be seen that when the formations are locked together, as shown in Fig. 5, a double interlocking is produced by the raw edge 22 engaging the crotch or angle of the locking shoulder 17 while the raw edge 23 of said locking shoulder is engaged in the crotch or angle of the locking shoulder 19.

The pipe section is thus doubly locked, a raw edge of each formation being engaged in the crotch or angle of the locking shoulder of the other formation, and it will be readily seen that these raw edges engaging in the locking shoulders will produce a tighter lock than is possible with a folded edge engaging a locking shoulder, because the raw edge will tend to cut into the surface of the metal with which it is engaged.

As shown in Figs. 6 and 7, a single interlocking formation is provided in which a raw edge of one formation is received in the crotch or angle of the locking shoulder of the other formation. In this form of the invention one edge portion of the pipe section 10a has a groove or pocket formation produced by folding the metal inward and back upon itself as at 13a and then forward and spaced from and substantially parallel with the portion 13a as shown at 14a, producing a pocket or groove 15a. Beyond the folded edge 16a the portion 14a is bent outward to form the angular locking shoulder 17a which may terminate in the forwardly extending reinforcing and guiding flange 18a.

The tongue formation is produced by bending the metal inward as at 19a and then forward, parallel with the peripheral wall 10a of the pipe and then inward and rearward upon itself as at 20a and 21a respectively, the portion 21a extending considerably rearward beyond the angular shoulder 19a and terminating in the raw edge 22a.

When the locking formations are snapped together to close the joint, as shown in Fig. 7, the raw edge 22a of the tongue formation will be received within the crotch or angle of the locking shoulder 17a of the other formation, biting into the surface of the metal and holding the parts in locked position.

The folded edge 16a of the pocket formation will be located substantially in contact with the shoulder 19a of the tongue formation, thus holding the raw edge 22a in the crotch or angle of the locking shoulder 17a.

In Figs. 8 to 12 inclusive is illustrated the manner in which the invention may be carried out with a tongue of single thickness upon the one formation rather than the folded tongue above described.

In these figures the pipe section is indicated generally at 10b and for the purpose of forming the tongue formation, one edge portion of the pipe section is bent inward, forming a shoulder 19b, the edge portion of the metal being then notched or slit at intervals as indicated at 25 and the portions of the metal between these notches are alternately bent forward and rearward in substantially the same plane, and preferably parallel with the peripheral wall 10b of the pipe producing the entering tongues 26 and locking tongues 27 respectively, each locking tongue terminating in the rearwardly disposed raw edge 28.

The locking formation upon the other edge of the pipe section is formed by folding the metal back upon itself as at 13b and then forward and spaced from the portion 13b as shown at 14b, forming between said portions a pocket or grove 15b of substantially the thickness of the metal. The edge portion of the metal is then bent outward, forming the angular locking shoulder 17b, which may be rearwardly inclined.

A reinforcing and guiding flange 18b may, if desired, be formed upon said locking shoulder as shown in Figs. 8, 9 and 12, or if desired, the locking shoulder may terminate in a raw edge 23b as shown in Figs. 10 and 11. The tongue formation is inserted directly and snapped into place in the pocket formation, as shown in Figs. 9 and 11, and the raw edge 28 of each locking tongue is tightly engaged in the crotch or angle of the angular locking shoulder 17b, biting into the surface of the metal and holding the formations tightly interlocked.

The folded edge 16b of the pocket formation is located substantially in contact with the shoulder 19b of the tongue formation, thus tending to hold the locking tongues 27 in tight engagement with the locking shoulders 17b.

The form of the invention shown in Figs. 8 to 12 inclusive provides a positive interlocking of the formations by engagement of a raw edge on the tongue formation within the crotch or angle of the angular locking shoulder upon the pocket formation and effects a considerable saving in metal over the double or folded tongue construction shown in Figs. 1 to 7 inclusive.

In each form of the invention as illustrated and described it will be seen that the interlocking formations are located entirely within the cylindric wall of the pipe section, the exterior of the pipe section being smooth and unbroken and the exterior of the lock joint being flush.

As is also clearly illustrated in the drawings, in each form of the invention as illustrated, the space between the first folded edge 16, 16a or 16b and the nearest portion of the outwardly angled locking shoulder 17, 17a or 17b is substantially equal to the distance between the forward side of the inwardly angled locking shoulder 19, 19a or 19b and the raw edge 22, 22a or 28 of the rearwardly projecting fold 21, 21a or 27 of the tongue. In other words, this space between the first folded edge and the nearest portion of the outwardly angled locking shoulder is substantially equal to the thickness of the inwardly angled locking shoulder 19, 19a or 19b plus the rearwardly projecting portion of the fold 21, 21a or 27. This permits the tongued or male edge portion to be inserted into the grooved or female edge portion of the seam and snapped into place in locked position without materially distorting or inwardly flexing the inner flange 14, 14a or 14b of the pocket, the inwardly angled locking shoulder and rearwardly projecting portion snapping into place between the first folded edge and the outwardly angled locking shoulder and snugly fitting therein so as to produce a tight flush joint with substantially no play or lost motion.

I claim:

1. A pipe section comprising a metallic sheet, one edge portion of which is folded against the inside of the sheet and then refolded to form a flange spaced from the first named fold and defining a groove, said flange terminating beyond the first folded edge in an outwardly angled locking shoulder having a forwardly extending reinforcing and guiding flange at its outer edge, the other edge portion of the sheet having an inwardly offset tongue folded inward upon itself insertable into said groove and terminating in a rearwardly disposed, raw edge for engagement in the angle of said angled locking shoulder.

2. A pipe section comprising a metallic sheet, one edge portion of which is folded against the inside of the sheet and then refolded to form a flange spaced from the first named fold and defining a groove, an outwardly angled locking shoulder upon said flange having a forwardly extending reinforcing and guiding flange at its outer edge, the other edge portion of the sheet having an inwardly angled locking shoulder formed therein and a tongue extending forward therefrom and folded inwardly upon itself insertable into said groove and terminating in a rearwardly disposed raw edge for engagement in the angle of the first named locking shoulder, the edge of the first named locking shoulder engaging in the angle of the second named locking shoulder.

3. A pipe section comprising a metallic sheet, one edge portion of which is folded against the inside of the sheet and then refolded to form a flange spaced from the first named fold and defining a groove, said flange terminating in an outwardly angled locking shoulder, the other edge of the sheet being bent inward and notched at intervals, the portions between the notches being bent alternately forward and rearward for insertion directly into said groove and for locking engagement in the angle of said angled locking shoulder respectively.

4. A pipe section comprising a metallic sheet, one edge portion of which is folded against the inside of the sheet and then refolded to form a flange spaced from the first named fold and defining a groove, said flange terminating in an outwardly angled locking shoulder, the other edge of the sheet being bent inward and notched at intervals, the portions between the notches being bent alternately forward and rearward, the forward portions being insertable directly into said groove, the rearward portions terminating in raw edges for locking engagement in the angle of said angled locking shoulder.

5. A pipe section comprising a metallic sheet, one edge portion of which is folded against the inside of the sheet and then refolded to form a flange spaced from the first named fold and defining a groove, said flange terminating beyond the first folded edge in an outwardly angled locking shoulder, the other edge portion of the sheet having an inwardly angled locking shoulder and a tongue folded inwardly upon itself insertable into said groove and terminating in a rearwardly disposed raw edge for engagement in the angle of said outwardly angled locking shoulder, the space between said first folded edge and the nearest portion of the outwardly angled locking shoulder being substantially equal to the distance between the forward side of said inwardly angled locking shoulder and said raw edge.

6. A pipe section comprising a metallic sheet, one edge portion of which is folded against the inside of the sheet and then refolded to form a flange spaced from the first named fold and defining a groove, an outwardly angled locking shoulder upon said flange beyond the first folded edge and terminating in a raw edge, the other edge portion of the sheet having an inwardly angled locking shoulder formed therein and a tongue extending forward therefrom and folded inwardly upon itself insertable into said groove and terminating in a rearwardly disposed raw edge for engagement in the angle of the outwardly angled locking shoulder, the raw edge of the outwardly angled locking shoulder engaging in the angle of the inwardly angled locking shoulder, the space between said first folded edge and the nearest portion of the outwardly angled locking shoulder being substantially equal to the distance between the forward side of said inwardly angled locking shoulder and said rearwardly disposed raw edge.

7. An interlocking sheet metal pipe seam having a male and a female edge, the female edge consisting of three layers of metal formed by folding the sheet inward upon itself, the terminal layer being spaced from the next adjacent layer to form a pocket, there being an outwardly angled locking shoulder upon the terminal layer beyond the first folded edge and extending the entire length of the pocket, and the male edge having an inwardly angled locking shoulder and a tongue extending forwardly into said pocket and a rearwardly folded portion extending rearwardly beyond the inwardly angled locking shoulder and having a raw edge in locking engagement with said outwardly angled locking shoulder, the space between said first folded edge and the nearest portion of the outwardly angled locking shoulder being substantially equal to the distance between the inwardly angled locking shoulder and the raw edge of the rearwardly extending portion of the male edge.

In testimony that I claim the above, I have hereunto subscribed my name.

JOSEPH A. KRANTZ.